US011052572B2

(12) United States Patent
Adolphs et al.

(10) Patent No.: US 11,052,572 B2
(45) Date of Patent: Jul. 6, 2021

(54) SYSTEM FOR MAKING FIBRE-REINFORCING MATERIALS FOR STRUCTURAL COMPONENTS

(71) Applicant: Owens Corning Intellectual Capital, LLC, Toledo, OH (US)

(72) Inventors: Georg Adolphs, Sabadell (ES); Toni Serarols Beltran, Suria (ES)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 302 days.

(21) Appl. No.: 16/303,199

(22) PCT Filed: Apr. 19, 2017

(86) PCT No.: PCT/US2017/028247
§ 371 (c)(1),
(2) Date: Nov. 20, 2018

(87) PCT Pub. No.: WO2017/204945
PCT Pub. Date: Nov. 30, 2017

(65) Prior Publication Data
US 2020/0324439 A1 Oct. 15, 2020

(30) Foreign Application Priority Data
May 26, 2016 (EP) ..................................... 16382235

(51) Int. Cl.
*B29B 11/16* (2006.01)
*B29C 70/30* (2006.01)
(Continued)

(52) U.S. Cl.
CPC .............. *B29B 11/16* (2013.01); *B29C 70/30* (2013.01); *B29C 70/54* (2013.01);
(Continued)

(58) Field of Classification Search
CPC ......... B29B 11/16; B29C 70/30; B29C 70/54; B29K 2105/0845; B29K 2307/04; B29K 2309/08
See application file for complete search history.

(56) References Cited

U.S. PATENT DOCUMENTS 8,226,866 B2 7/2012 Arelt
2004/0067711 A1* 4/2004 Bliton ..................... D04H 3/02
442/394

(Continued)

FOREIGN PATENT DOCUMENTS

CN 202415904 U 9/2012
DE 102010044203 A1 5/2011
(Continued)

OTHER PUBLICATIONS

Office Action from Chinese Application No. 201780040421.9 dated Sep. 14, 2020.
(Continued)

*Primary Examiner* — Jeffry H Aftergut
(74) *Attorney, Agent, or Firm* — Calfee, Halter & Griswold LLP

(57) ABSTRACT

Systems for and methods of forming structural components, such as a spar cap (503), from layers of a fiber reinforced material obtained from rolls of the material are disclosed. The system comprising: a plurality of rolls (514) including a first roll (514a) and a second roll (514b) of the fiber reinforced material (504), the first roll has one or more first lines (530) printed thereon. The first lines indicating where the fiber reinforced material on the first roll is to be separated into a plurality of discrete first pieces (531-1) for forming the structural component (503). The fiber reinforced material on the second roll has one or more second lines (530) printed thereon. The second lines indicating where the fiber reinforced material on the second roll is to be separated into a (Continued)

plurality of discrete second pieces (531-2) for forming the structural component (503). The systems and methods achieve a substantial reduction in the amount of wasted material.

10 Claims, 9 Drawing Sheets

(51) Int. Cl.
  *B29C 70/54* (2006.01)
  *B29K 105/08* (2006.01)
  *B29K 307/04* (2006.01)
  *B29K 309/08* (2006.01)

(52) U.S. Cl.
  CPC .. *B29K 2105/0845* (2013.01); *B29K 2307/04* (2013.01); *B29K 2309/08* (2013.01)

(56) References Cited

U.S. PATENT DOCUMENTS

| | | | |
|---|---|---|---|
| 2009/0065302 A1* | 3/2009 | Kelly | B29C 70/025 |
| | | | 182/194 |
| 2012/0247643 A1 | 10/2012 | Kramp | |
| 2014/0087198 A1* | 3/2014 | Hou | B32B 27/36 |
| | | | 428/474.4 |
| 2015/0165674 A1 | 6/2015 | Spellman et al. | |

FOREIGN PATENT DOCUMENTS

| | | |
|---|---|---|
| JP | H05111898 A | 5/1993 |
| JP | H0581246 U | 11/1993 |
| WO | 2006015598 A1 | 2/2006 |

OTHER PUBLICATIONS

Search Report and Written Opinion from EP Application No. 16382235.6 dated Nov. 7, 2016.
International Search Report and Written Opinion from PCT Application No. PCT/US2017/028247 dated Jul. 31, 2017.
Office Action from Chinese Application No. 201780040421.9 dated Mar. 31, 2021.
Communication under Rule 71(3) EPC from European Application No. 17720930.1 dated Apr. 30, 2021.
Office Action from Japanese Application No. 2018-561542 dated Apr. 5, 2021.

* cited by examiner

SYSTEM FOR MAKING FIBRE-REINFORCING MATERIALS FOR STRUCTURAL COMPONENTS

RELATED APPLICATIONS

This application is the U.S. national stage entry of PCT/US2017/028247, filed on Apr. 19, 2017, which claims priority to and all benefit of European Patent Application Serial No. 16382235.6, filed on May 26, 2016, now abandoned, the entire disclosures of which are fully incorporated herein by reference.

OBJECT OF THE INVENTION

The general inventive concepts relate to fiber reinforced materials and, more particularly, to systems for and methods of using fiber reinforced materials to produce structural components.

BACKGROUND OF THE INVENTION

It is known to use fiber reinforced materials, such as fabrics, mats, veils, and the like to form structural components. For example, U.S. Pat. No. 8,226,866 discloses production of a laminate by a continuous process. The process involves pulling tows of fibers (e.g., glass fibers or carbon fibers) through a bath of resin, wherein the resin is then cured to form the laminate. Within the laminate, the fibers are arranged side by side and substantially parallel to one another. Such a laminate is often referred to as a unidirectional laminate. The laminate can have a thickness of 1 mm to several mm. The laminate can be formed to have almost any practical width. After production, the sheet-like laminate is wound up into coils, each having a length of a couple hundred of meters.

These laminates are useful for forming structural components. As noted in the '866 patent, these laminates can be stacked up or otherwise layered to form a spar cap of a blade of a wind energy turbine. In particular, several layers of cut pieces of the laminate are arranged on top of each other to form the structural component. The pieces are arranged within specific areas and regions of a mold. An infusion process introduces a curable matrix material (a resin) into the mold in order to penetrate the layers of the laminate. A vacuum can be applied to the mold during the infusion process to press the layers of cut pieces together and aid the resin in penetrating the layers.

A conventional system 100 for forming a structural component, in this case a spar cap of a wind turbine blade, will be described with reference to FIGS. 1-3. In the system 100, a machine 102 continuously produces a fiber reinforced material in the form of a woven fabric 104 having a predetermined width w. The fabric 104 includes or is otherwise reinforced with fibers (e.g., glass and/or carbon fibers) that extend substantially along a length of the fabric 104 (i.e., parallel to the arrow 106). As the fabric 104 exits the machine 102 and travels in a direction indicated by the arrow 106, the fabric 104 is wound at a roll area 108. A winder or other conveying means pulls the fabric 104 from the machine 102 to the roll area 108. Blades or other cutting means form slits 110 in the fabric 104 prior to the roll area 108. In this manner, discrete rolls 112 of the fabric 104 are formed. In the embodiment shown in FIG. 1, three slits 110 are made to form four rolls 112, with each roll 112 having an approximate width of w/4.

Once a predetermined quantity of the fabric 104 has been wound to the roll area 108, a manual cut 114 is made across the width w of the fabric 104, thereby separating the rolls 112 from the fabric 104 exiting the machine 102. The machine 102 may be stopped or otherwise paused during this cutting operation. Because the cut 114 is made manually (e.g., by an operator using shears), the ends of each roll 112 are not necessarily even. Nonetheless, a quantity (i.e., length) of the fabric 104 on each roll 112 is substantially the same.

As shown in FIG. 2, once the rolls 112 are separated from the fabric 104, a number of the rolls 112 are placed on a pallet 120 or otherwise packaged together for storage and/or transit, prior to use thereof. In FIG. 2, eight rolls 112 rest on the pallet 120.

When it is time to form the spar cap, one or more pallets 120 of rolls 112 are moved into proximity to a mold 128 used to form the spar cap. As noted above, the spar cap is formed by layering, such as by hand laying, a number of cut pieces of the fabric 104 from the rolls 112. The number and placement of the cut pieces within the mold define the properties (e.g., shape, thickness) of the spar cap.

As shown in FIG. 3, a first roll 130a of the fabric 104 is taken off the pallet 120 and cut into pieces of desired lengths to be placed in the mold 128. In particular, a first quantity of the fabric 104 is unrolled in the direction of arrow 132 and then cut to form a first piece 134 of length $L_1$ represented by the dashed line 1-1. Next, a second quantity of the fabric 104 is unrolled in the direction of arrow 132 and then cut to form a second piece 136 of length $L_2$ represented by the dashed line 2-2. As lines 1-1 and 2-2 indicate, the length $L_1$ of the first piece 134 is greater than the length $L_2$ of the second piece 136. While some cut pieces may have the same length, many of the cut pieces will have different lengths. Each successive cut piece is positioned on or otherwise overlapped with the preceding cut pieces. Typically, many cut pieces (e.g., 50 or more) are required. This process is repeated until a desired thickness and shape is obtained within the mold 128. Finally, resin is introduced into the mold, such as by the aforementioned infusion process, and cured to form the spar cap.

Since many cut pieces of the fabric 104 are required to form the spar cap, several rolls 112 must be used to provide the necessary quantity of the fabric 104. As noted above, each of the rolls 112 holds substantially the same quantity of the fabric 104. As a result, the cut pieces from a roll 112 (e.g., the roll 130a) often do not entirely exhaust the fabric 104 on the roll 112. In other words, a quantity of the fabric 104 that is too small to be used for a continuous cut piece (or at least the next cut piece) remains on the roll 112. Each such roll 112 (e.g., the roll 130b) represents wasted fabric 104. This phenomenon is further illustrated in the example 400 depicted in FIG. 4.

As shown in FIG. 4, fifteen rolls 112 (i.e., rolls $R_1$ to $R_{15}$) are needed to obtain fifty cut pieces (i.e., $CP_1$ to $CP_{50}$) of the fabric 104 required to produce the spar cap via the mold 128. The length of each of the rolls 112 is substantially the same; in other words, each roll 112 holds approximately the same quantity of the fabric 104. From the first roll $R_1$, three cut pieces (i.e., $CP_1$, $CP_2$, and $CP_3$) of the fabric 104 are obtained, while a remaining quantity 402 of the fabric 104 on the roll $R_1$ is insufficient (e.g., too short) to produce a cut piece or at least the next cut piece $CP_4$. Similarly, from the second roll $R_2$, three cut pieces (i.e., $CP_4$, $CP_5$, and $CP_6$) of the fabric 104 are obtained, while a remaining quantity 404 of the fabric 104 on the roll $R_2$ is insufficient (e.g., too short) to produce a cut piece or at least the next cut piece $CP_7$.

From the third roll $R_3$, four cut pieces (i.e., $CP_7$, $CP_8$, $CP_9$, and $CP_{10}$) of the fabric 104 are obtained, while a remaining quantity 406 of the fabric 104 on the roll $R_3$ is insufficient (e.g., too short) to produce a cut piece or at least the next cut piece $CP_{11}$. This process is repeated until the final roll $R_{15}$, wherein three cut pieces (i.e., $CP_{48}$, $CP_{49}$, and $CP_{50}$) of the fabric 104 are obtained, while a remaining quantity 430 of the fabric 104 on the roll $R_{15}$ is insufficient (e.g., too short) to produce another cut piece. Thus, the amount of wasted fabric increases for each roll in which the amount of the fabric 104 on the roll is not fully utilized. Given this approach, the amount (e.g., 402, 404, 406, . . . , 430) of wasted fabric 104 would likely be repeated for each identical part (e.g., spar cap) produced. The cost penalty for this wasted fabric 104 is not limited to the production costs associated therewith, but also encompasses the related costs (e.g., transportation, landfill) of disposing of the scrap material.

In view of the above, there is an unmet need for improved systems for and methods of using fiber reinforced materials to produce structural components.

DESCRIPTION OF THE INVENTION

It is proposed herein to provide improved systems for and methods of forming structural components from layers of a fiber reinforced material obtained from rolls of the material.

The general inventive concepts relate to and contemplate a system of fiber reinforced material for producing a structural component. In an exemplary embodiment, the system comprises: a plurality of rolls of the fiber reinforced material, said plurality of rolls including a first roll of the fiber reinforced material and a second roll of the fiber reinforced material, wherein a length of the fiber reinforced material on the first roll differs from a length of the fiber reinforced material on the second roll, wherein the fiber reinforced material on the first roll has one or more first lines printed thereon, said first lines indicating where the fiber reinforced material on the first roll is to be separated into a plurality of discrete first pieces for forming the structural component, and wherein the fiber reinforced material on the second roll has one or more second lines printed thereon, said second lines indicating where the fiber reinforced material on the second roll is to be separated into a plurality of discrete second pieces for forming the structural component.

In an exemplary embodiment, the fiber reinforced material on the first roll has one or more partial cuts therein, said partial cuts corresponding to where the fiber reinforced material on the first roll is to be separated into the plurality of discrete first pieces for forming the structural component, and wherein the fiber reinforced material on the second roll has one or more partial cuts therein, said partial cuts corresponding to where the fiber reinforced material on the second roll is to be separated into the plurality of discrete second pieces for forming the structural component.

In an exemplary embodiment, the partial cuts are made by one or more lasers.

Typically, the system achieves a substantial reduction in the amount of wasted material. In an exemplary embodiment, a total length of the first pieces of the fiber reinforced material is at least 98% of the length of the fiber reinforced material on the first roll, and a total length of the second pieces of the fiber reinforced material is at least 98% of the length of the fiber reinforced material on the second roll.

In an exemplary embodiment, a total length of the first pieces of the fiber reinforced material is at least 99% of the length of the fiber reinforced material on the first roll, and a total length of the second pieces of the fiber reinforced material is at least 99% of the length of the fiber reinforced material on the second roll.

In an exemplary embodiment, a total length of the first pieces of the fiber reinforced material is at least 99.9% of the length of the fiber reinforced material on the first roll, and a total length of the second pieces of the fiber reinforced material is at least 99.9% of the length of the fiber reinforced material on the second roll.

In an exemplary embodiment, a total length of the first pieces of the fiber reinforced material is equal to the length of the fiber reinforced material on the first roll, and a total length of the second pieces of the fiber reinforced material is equal to the length of the fiber reinforced material on the second roll.

In an exemplary embodiment, each of the first pieces of the fiber reinforced material has a layer number printed thereon, and each of the second pieces of the fiber reinforced material has a layer number printed thereon, wherein the layer numbers indicate an order in which the first pieces of the fiber reinforced material and the second pieces of the fiber reinforced material are to be positioned relative to one another when forming the structural component.

In some exemplary embodiments, the layer number may take the form of a number, a symbol or image, or any other indicia that represents an order of placement for the piece of fiber reinforced material associated therewith.

In some exemplary embodiments, the first pieces of the fiber reinforced material and/or the second pieces of the fiber reinforced material may have additional information (i.e., other than layer-identifying information) printed thereon.

In an exemplary embodiment, the fiber reinforced material is a non-crimp fabric.

In an exemplary embodiment, the fiber reinforced material is a woven fabric.

In an exemplary embodiment, the fiber reinforced material includes a plurality of glass fibers. In an exemplary embodiment, the fiber reinforced material includes a plurality of carbon fibers.

In an exemplary embodiment, the plurality of rolls of the fiber reinforced material are packaged together. In an exemplary embodiment, the plurality of rolls of the fiber reinforced material are packaged together on one or more pallets.

In an exemplary embodiment, the structural component is at least part of a wind turbine blade. In an exemplary embodiment, the structural component is a spar cap.

The general inventive concepts relate to and contemplate a system for producing a material for a structural component. In an exemplary embodiment, the system comprises: an apparatus for producing a fabric, said fabric including a plurality of reinforcement fibers; at least one printer for printing on the fabric; a winder for winding the fabric; and a cutter for making at least one slit in the fabric to separate the fabric into a plurality of rolls of the fabric, said plurality of rolls including a first roll of the fabric and a second roll of the fabric; wherein a length of the fabric on the first roll differs from a length of the fabric on the second roll, wherein the printer prints one or more first lines on the fabric on the first roll, said first lines indicating where the fabric on the first roll is to be separated into a plurality of discrete first pieces for forming the structural component, and wherein the printer prints one or more second lines on the fabric on the second roll, said second lines indicating where the fabric on the second roll is to be separated into a plurality of discrete second pieces for forming the structural component.

In an exemplary embodiment, the system further comprises at least one laser cutter. The laser cutter makes one or more partial cuts in the fabric of the first roll, said partial cuts facilitating separation of the fabric into the discrete first pieces for forming the structural component, and wherein the laser cutter makes one or more partial cuts in the fabric of the second roll, said partial cuts facilitating separation of the fabric into the discrete second pieces for forming the structural component.

In an exemplary embodiment, a total length of the first pieces of the fabric is at least 95% of the length of the fabric on the first roll, and a total length of the second pieces of the fabric is at least 95% of the length of the fabric on the second roll.

In an exemplary embodiment, a total length of the first pieces of the fabric is at least 97% of the length of the fabric on the first roll, and a total length of the second pieces of the fabric is at least 97% of the length of the fabric on the second roll.

In an exemplary embodiment, a total length of the first pieces of the fabric is at least 98% of the length of the fabric on the first roll, and a total length of the second pieces of the fabric is at least 98% of the length of the fabric on the second roll.

In an exemplary embodiment, a total length of the first pieces of the fabric is at least 99% of the length of the fabric on the first roll, and a total length of the second pieces of the fabric is at least 99% of the length of the fabric on the second roll.

In an exemplary embodiment, a total length of the first pieces of the fabric is at least 99.9% of the length of the fabric on the first roll, and a total length of the second pieces of the fabric is at least 99.9% of the length of the fabric on the second roll.

In an exemplary embodiment, a total length of the first pieces of the fabric is equal to the length of the fabric on the first roll, and a total length of the second pieces of the fabric is equal to the length of the fabric on the second roll.

In an exemplary embodiment, the printer prints a layer number on each of the first pieces of the fabric and each of the second pieces of the fabric, wherein the layer numbers indicate an order in which the first pieces of the fabric and the second pieces of the fabric are to be positioned relative to one another when forming the structural component.

In an exemplary embodiment, the fiber reinforced material is a non-crimp fabric.

In an exemplary embodiment, the fabric is a woven fabric.

In an exemplary embodiment, the reinforcement fibers comprise glass fibers. In an exemplary embodiment, the reinforcement fibers comprise carbon fibers.

The general inventive concepts relate to and contemplate a method of forming a fiber reinforced material for use in producing a structural component. In an exemplary embodiment, the method comprises: forming a plurality of rolls of the fiber reinforced material, said plurality of rolls including a first roll of the fiber reinforced material and a second roll of the fiber reinforced material, wherein a length of the fiber reinforced material on the first roll differs from a length of the fiber reinforced material on the second roll; printing one or more first lines on the fiber reinforced material on the first roll, said first lines indicating where the fiber reinforced material on the first roll is to be separated into a plurality of discrete first pieces for forming the structural component; and printing one or more second lines on the fiber reinforced material on the second roll, said second lines indicating where the fiber reinforced material on the second roll is to be separated into a plurality of discrete second pieces for forming the structural component.

In an exemplary embodiment, a total length of the first pieces of the fiber reinforced material is at least 95% of the length of the fiber reinforced material on the first roll, and a total length of the second pieces of the fiber reinforced material is at least 95% of the length of the fiber reinforced material on the second roll.

In an exemplary embodiment, a total length of the first pieces of the fiber reinforced material is at least 97% of the length of the fiber reinforced material on the first roll, and a total length of the second pieces of the fiber reinforced material is at least 97% of the length of the fiber reinforced material on the second roll.

In an exemplary embodiment, a total length of the first pieces of the fiber reinforced material is at least 98% of the length of the fiber reinforced material on the first roll, and a total length of the second pieces of the fiber reinforced material is at least 98% of the length of the fiber reinforced material on the second roll.

In an exemplary embodiment, a total length of the first pieces of the fiber reinforced material is at least 99% of the length of the fiber reinforced material on the first roll, and a total length of the second pieces of the fiber reinforced material is at least 99% of the length of the fiber reinforced material on the second roll.

In an exemplary embodiment, a total length of the first pieces of the fiber reinforced material is at least 99.9% of the length of the fiber reinforced material on the first roll, and a total length of the second pieces of the fiber reinforced material is at least 99.9% of the length of the fiber reinforced material on the second roll.

In an exemplary embodiment, a total length of the first pieces of the fiber reinforced material is equal to the length of the fiber reinforced material on the first roll, and a total length of the second pieces of the fiber reinforced material is equal to the length of the fiber reinforced material on the second roll.

In an exemplary embodiment, the method further comprises: printing a layer number on each of the first pieces of the fiber reinforced material; and printing a layer number on each of the second pieces of the fiber reinforced material, wherein the layer numbers indicate an order in which the first pieces of the fiber reinforced material and the second pieces of the fiber reinforced material are to be positioned relative to one another when forming the structural component.

In an exemplary embodiment, the fiber reinforced material is a non-crimp fabric.

In an exemplary embodiment, the fiber reinforced material is a woven fabric.

In an exemplary embodiment, the fiber reinforced material includes a plurality of glass fibers. In an exemplary embodiment, the fiber reinforced material includes a plurality of carbon fibers.

In an exemplary embodiment, the method further comprises: packaging the plurality of rolls of the fiber reinforced material together. In an exemplary embodiment, the plurality of rolls of the fiber reinforced material are stored on one or more pallets.

In an exemplary embodiment, the structural component is at least part of a wind turbine blade. In an exemplary embodiment, the structural component is a spar cap.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which.

DESCRIPTION OF AN EMBODIMENT OF THE INVENTION

Figure 1:
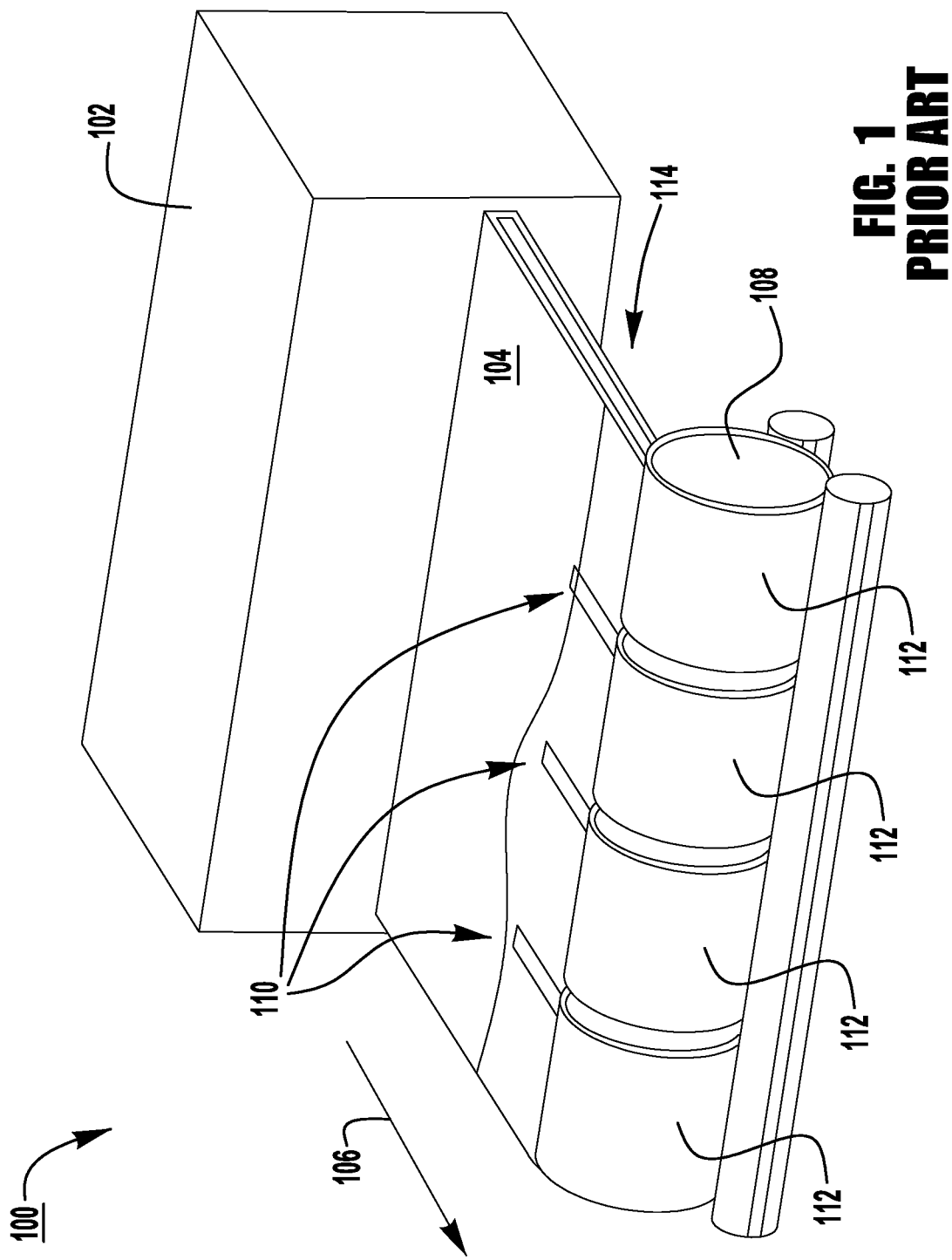
FIG. 1 is a diagram of a conventional system for forming a spar cap.
Figure 2:
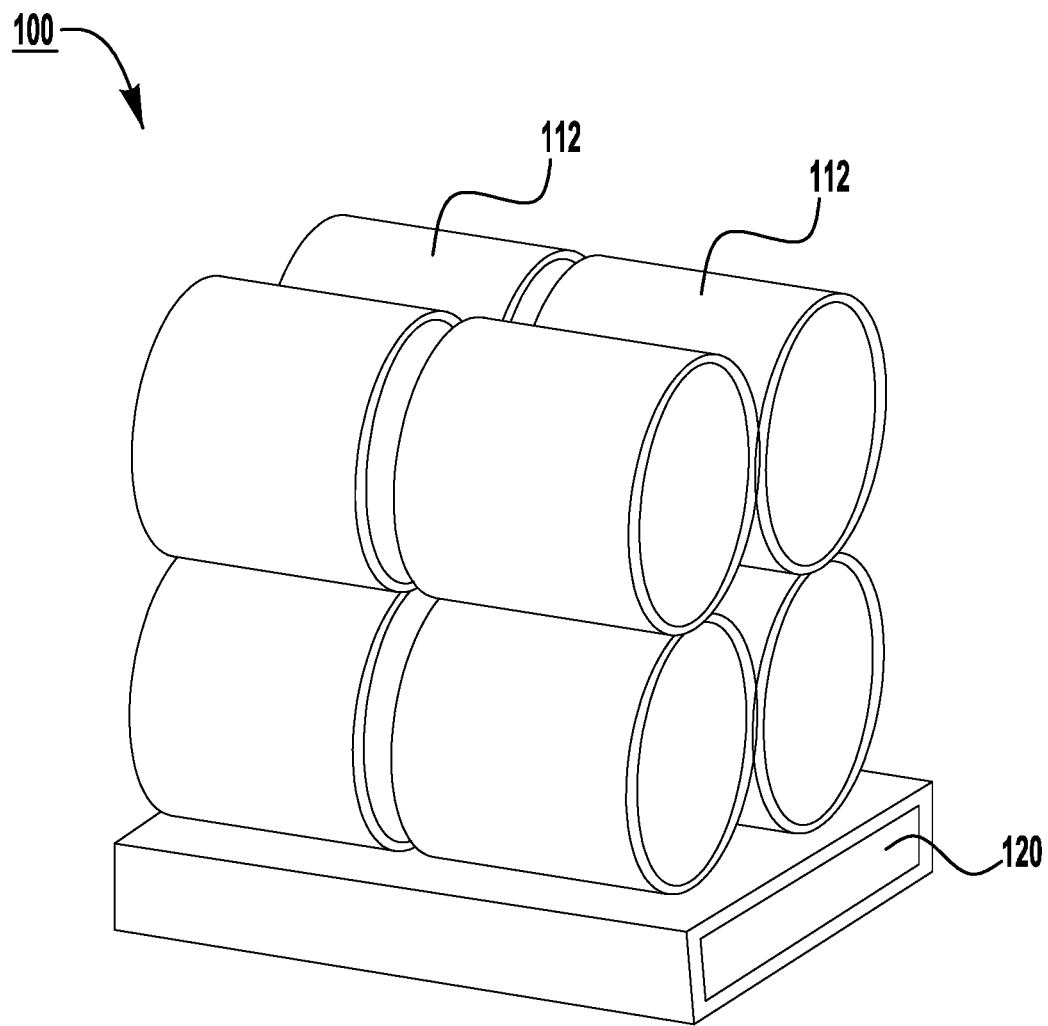
FIG. 2 is a diagram of rolls of a woven fabric produced by the system of FIG. 1.
Figure 3:
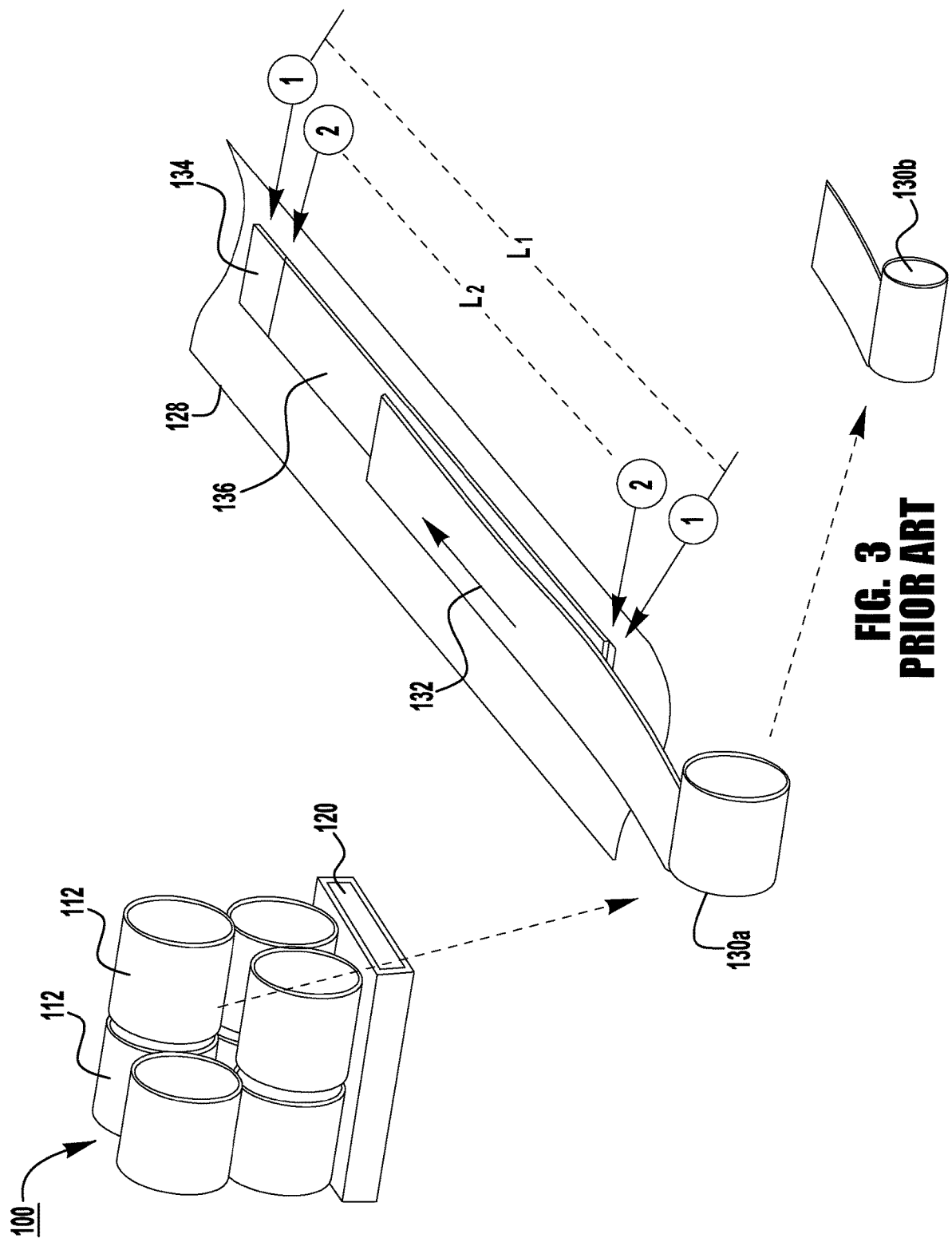
FIG. 3 is a diagram showing use of the rolls of FIG. 2 during production of the spar cap.
Figure 4:
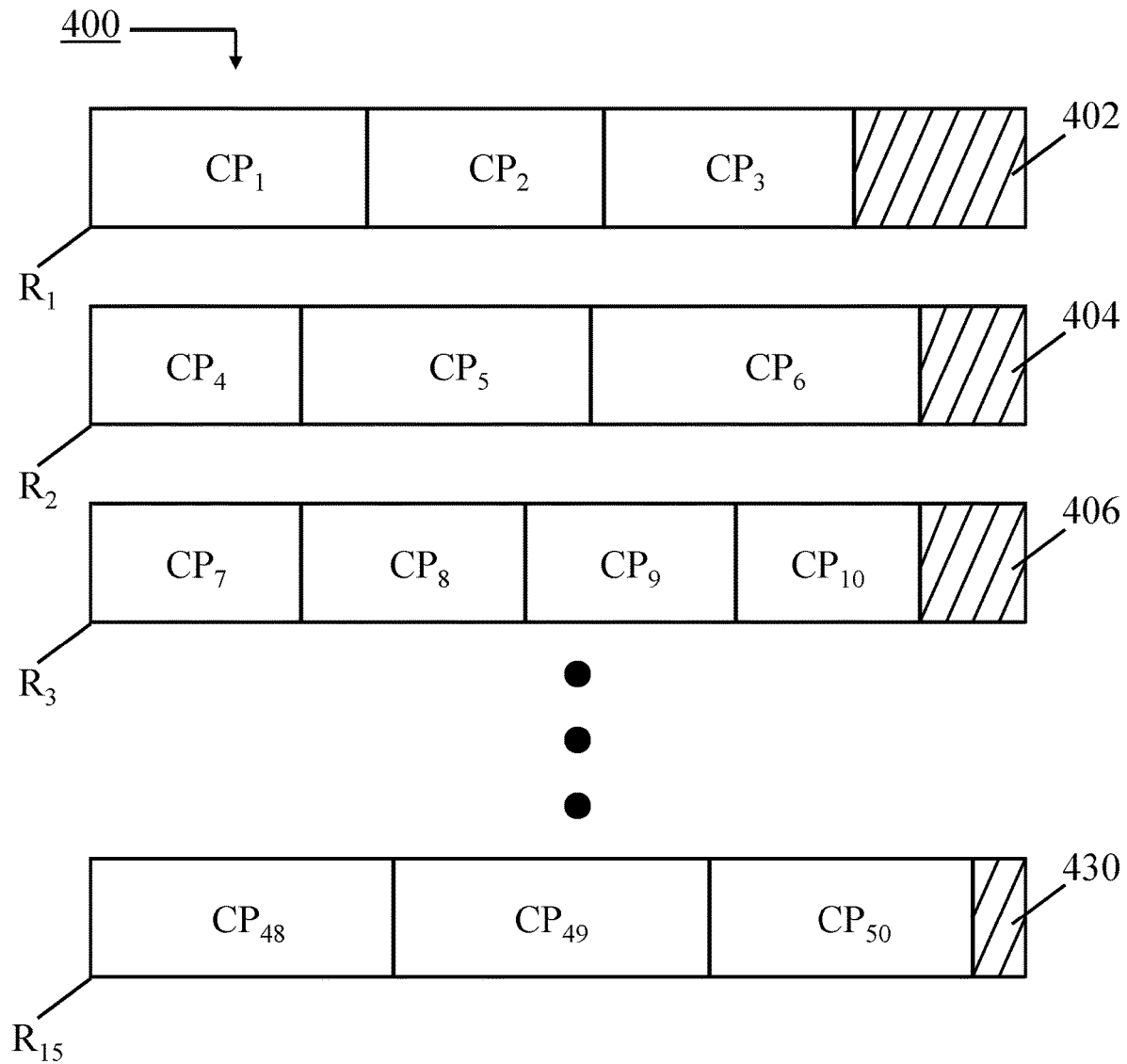
FIG. 4 is a diagram of a collection of rolls illustrating wasted fabric within a conventional system, such as the system of FIG. 1.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass systems for and methods of using fiber reinforced materials to produce structural components.

A system 500 for forming a structural component 501 (e.g., a spar cap 503), according to an exemplary embodiment, will be described with reference to FIGS. 5-7. In the system 500, a machine 502 continuously produces a fiber reinforced material in the form of a woven fabric 504 having a predetermined width w. The general inventive concepts are not limited to woven fabrics, and other fiber reinforced materials such as mats, veils, and the like could also be used. In some exemplary embodiments, the fiber reinforced material is a non-crimp fabric. The fabric 504 includes or is otherwise reinforced with fibers (e.g., glass and/or carbon fibers). In some embodiments, the fibers extend substantially along a length of the fabric 504 (i.e., parallel to the arrow 506). As the fabric 504 exits the machine 502 and travels in a direction indicated by the arrow 506, the fabric 504 is wound at a roll area 508. A winder or other conveying means pulls the fabric 504 from the machine 502 to the roll area 508.

The system 500 also includes one or more printing means, for example, ink jet print heads 520. In the embodiment shown in FIG. 5, the system 500 includes four discrete print heads 520. In other embodiments, more or fewer print heads 520 could be used. The print heads 520 are capable of printing information (e.g., text and/or graphics) directly on the fabric 504 after the fabric 504 exits the machine 502. In some embodiments, the print heads 520 could be integrated with the machine 502. A controller (not shown) allows an operator to define what information should be printed and when (e.g., where on the fabric 504) the information should be printed. In some embodiments, the controller can be a general purpose computer that is interfaced with the print heads 520 and programmed to cause the print heads 520 to print the desired information at the desired locations on the fabric 504. Communications between the computer and the print heads 520 can take place via a wired connection (e.g., a USB cable) or a wireless connection.

Any type of information can be printed on the fabric 504. Typically, the information is useful in downstream processing/use of the fabric 504. For example, in the embodiment shown in FIG. 5, two types of information are printed on the fabric 504: cut lines 530 and layer numbers 532. The utility of this information will be further described below.

In some embodiments, the system 500 may include one or more cutting means, for example, laser cutters 570. In the embodiment shown in FIG. 5, the system 500 includes four discrete laser cutters 570. In other embodiments, more or fewer laser cutters 570 could be used. The laser cutters 570 are capable of making cuts 580 in the fabric 504 after the fabric 504 exits the machine 502. In some embodiments, the laser cutters 570 could be integrated with the machine 502. A controller (not shown) allows an operator to specify information (e.g., location, depth, width) for the cuts 580 to be made in the fabric 504. In some embodiments, the controller can be a general purpose computer that is interfaced with the laser cutters 570 and programmed to cause the laser cutters 570 to perform the cuts 580 at the desired locations on the fabric 504. Communications between the computer and the laser cutters 570 can take place via a wired connection (e.g., a USB cable) or a wireless connection.

Any type of cuts 580 can be made in the fabric 504. Typically, the cuts 580 are useful in downstream processing/ use of the fabric 504. For example, in the embodiment shown in FIG. 5, the cuts 580 are partial cuts that do not extend all the way through the fabric. Instead, the partial cuts have a predetermined width and depth. The width of the cuts 580 can be varied, for example, by making multiple adjacent passes with the laser. The depths of the cuts 580 can be varied, for example, by increasing/decreasing the power supplied to the laser and/or the speed at which the laser is applied to the fabric 504. The cuts 580 can be continuous or discontinuous (e.g., forming a type of perforation in the fabric 504).

The cuts 580 can facilitate separation of the fabric 504 into individual pieces (e.g., the cut pieces 531 described below) during use of the fabric 504 to form the structural component 501. In particular, the cuts 580 make it easier to make the final cuts, which are usually manually made. In some embodiments, the cuts 580 overlap the cut lines 530. In some embodiments, the cuts 580 replace the cut lines 530, wherein the partial cuts themselves serve as indicators as to where the final cuts on the fabric 504 are to be made.

Blades or other cutting means form slits 510 in the fabric 504 prior to the roll area 508. In this manner, discrete rolls 514 of the fabric 504 are formed. In some embodiments, the laser cutters 570 are used to form the slits 510. In the embodiment shown in FIG. 5, three slits 510 are made to form four rolls 514, with each roll 514 having an approximate width of w/4. In other embodiments, more or fewer (including one at a time) rolls 514 could be produced by the system 500.

Once a predetermined quantity of the fabric 504 has been wound to the roll area 508, a cut 516 is made across the width w of the fabric 504, thereby separating the rolls 514 from the fabric 504 exiting the machine 502. The cut 516 is typically made manually. The machine 502 may be stopped or otherwise paused during this cutting operation. The aforementioned cut lines 530, or a variation thereof, can be used to clearly and precisely mark where the fabric 504 should be cut to form the discrete rolls 514. In some embodiments, the laser cutters 570 could be used to cut the fabric 504 to form the discrete rolls 514.

Figure 5:
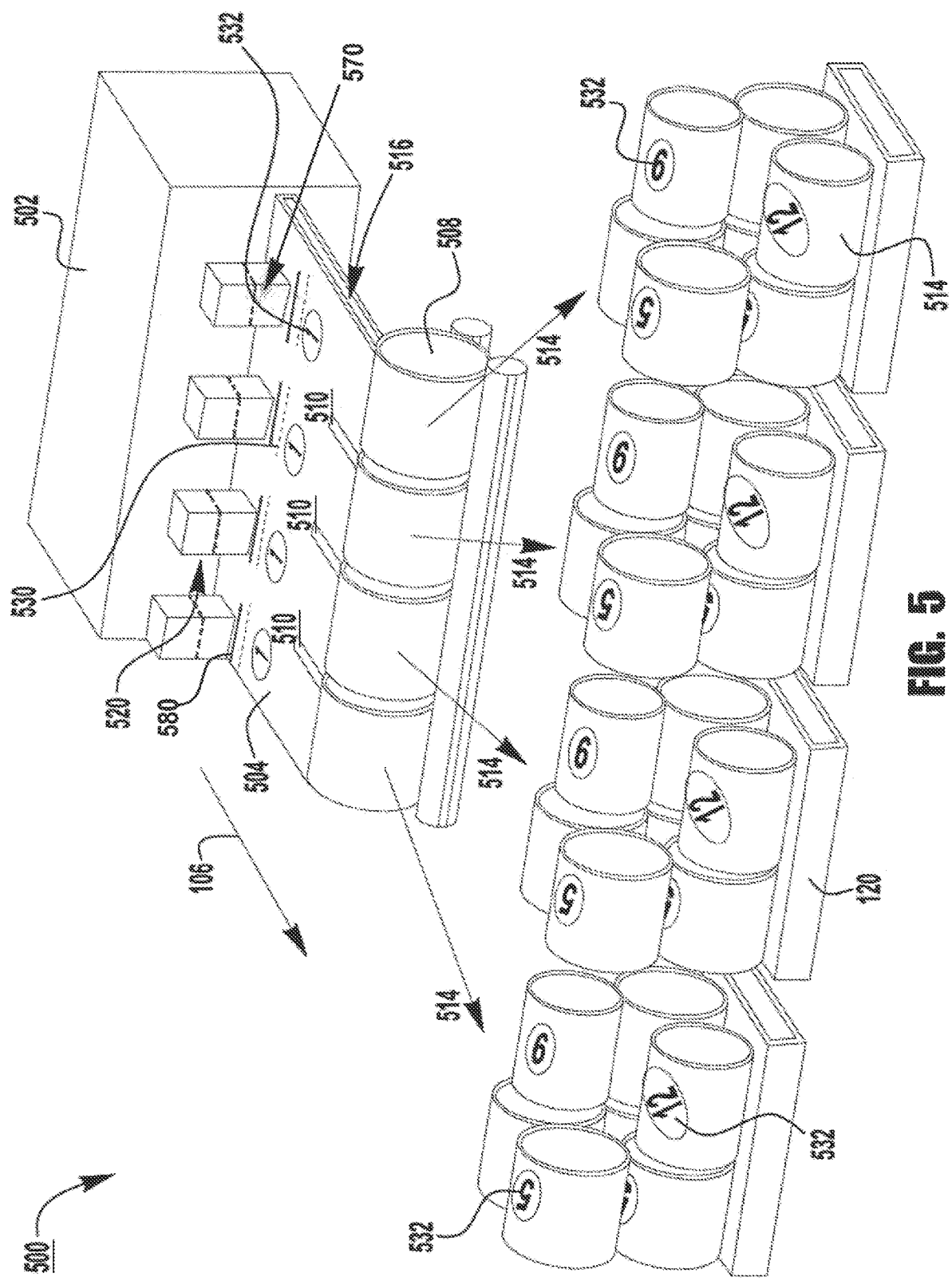
FIG. 5 is a diagram of a system for forming a structural component, such as a spar cap, according to an exemplary embodiment.

Thereafter, each of the four identical rolls 514 formed by the slits 510 is placed on a separate pallet 120, as shown in FIG. 5. This process is repeated for subsequent groups of rolls 514, until each pallet 120 is filled with a desired number of rolls 514. In some embodiments, the rolls 514 are loaded onto the pallets 120 in a manner that facilitates their downstream use. For example, the rolls 514 may be ordered on the pallet 120 such that the easiest rolls 514 to access or otherwise use from the pallet 120 are the first rolls 514 needed to build-up the structural component 501 (e.g., the spar cap 503). As another example, the rolls 514 may be placed on the pallet 120 in an inverse order so that when the rolls 514 are unloaded from the pallet 120, the rolls 514 assume an order which facilitates their use in forming the spar cap 503. In some embodiments, the rolls 514 needed to form the spar cap 503 fit on a single pallet 120. In other embodiments, the rolls 514 needed to form the spar cap 503 may span multiple pallets 120.

Figure 6:
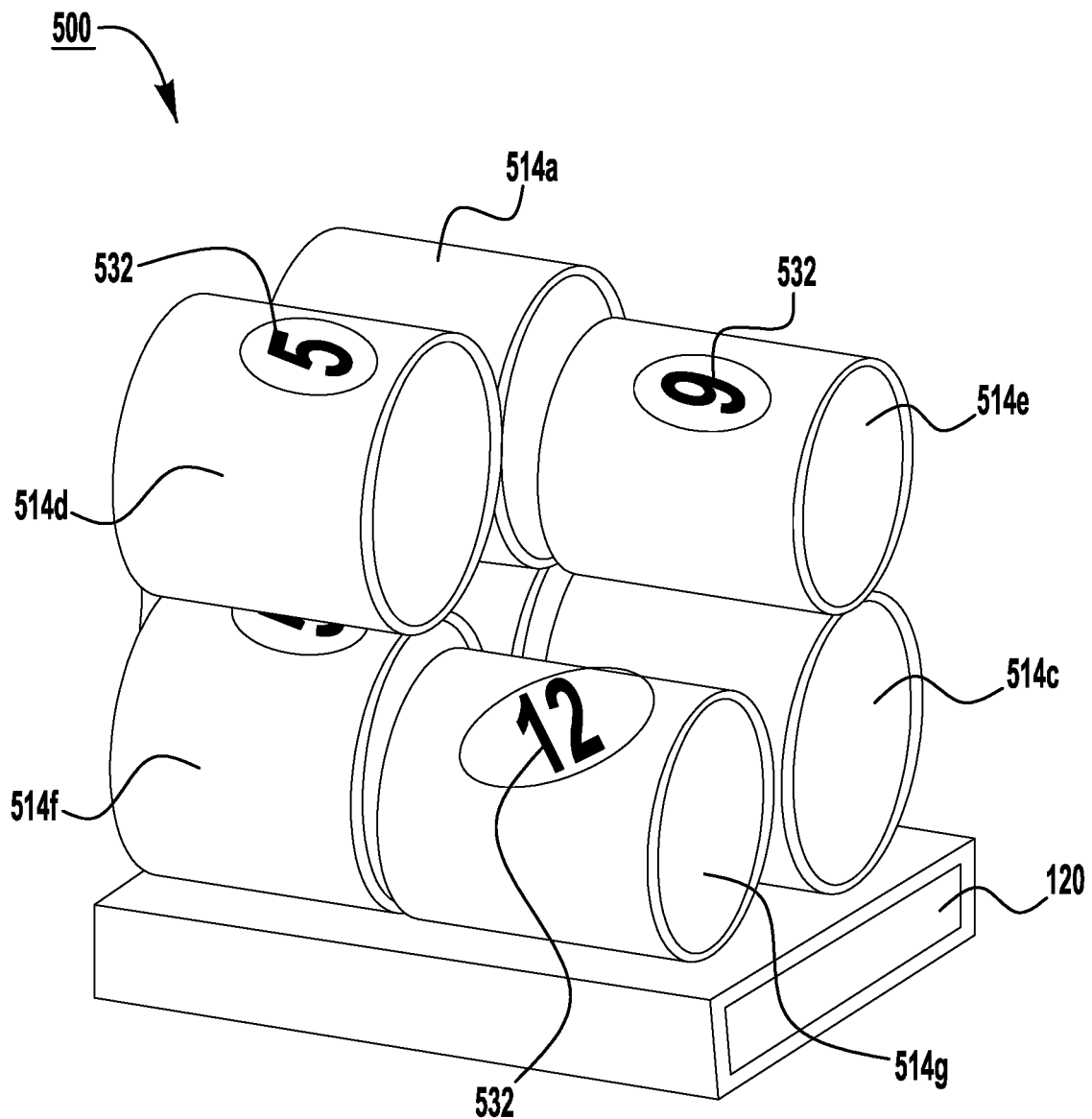
FIG. 6 is a diagram of rolls of a fibrous material produced by the system of FIG. 5.

A pallet 120, according to an exemplary embodiment, is shown in FIG. 6. The pallet 120 includes seven rolls 514, i.e., a first roll 514a, a second roll 514b, a third roll 514c, a fourth roll 514d, a fifth roll 514e, a sixth roll 514f, and a seventh roll 514g. It will be appreciated that a pallet 120 could include fewer or more rolls. Each roll 514 on the pallet 120 includes identifying information printed thereon that can be used to distinguish the rolls 514 from one another. In particular, the rolls 514 have information thereon indicating an order in which the rolls 514 are to be used to form the spar cap 503. In some embodiments, at least one layer number 532, which is visible on the outer surface of the roll 514, can be used as the identifying information for the roll 514.

While a quantity (i.e., length) of the fabric 504 on each roll 514 is substantially the same for the rolls 514 that are produced simultaneously (i.e., each group of four rolls 514 formed by the slits 510 at the same time—for example, rolls 514a), a subsequent group of rolls 514 (e.g., rolls 514b) will often hold a different quantity of the fabric 504. In general, all the fabric 504 on a roll 514 is associated with at least one layer to be used to form the spar cap 503, such that no wasted fabric 504 results.

The cut lines 530 delineate where cuts should be made on each roll 514 to separate the fabric 504 into specific cut pieces 531, sheets, or the like (e.g., layers to be used to form the spar cap 503). Thus, a cut line 530 is situated between each pair of adjacent cut pieces 531 (i.e., to mark the end of one layer and the beginning of another layer). On a related note, the layer numbers 532 indicate in what order these cut pieces 531 should be placed in the mold 128 to form the spar cap 503. Thus, a layer number 532 is situated somewhere on the fabric 504 between each pair of cut lines 530. In some exemplary embodiments, multiple instances of a layer number 532 can be provided on a single cut piece 531. For example, a layer number 532 can appear after one cut line 530 and before another cut line 530 defining a cut piece 531.

When it is time to form the spar cap 503, one or more pallets 120 of rolls 514 (or simply the rolls 514 themselves) are moved into proximity to a mold 128 used to form the spar cap 503. As noted above, the spar cap 503 is formed by layering, such as by hand laying, a number of cut pieces 531 of the fabric 504 from the rolls 514. The number and placement of the cut pieces 531 within the mold define the properties (e.g., shape, thickness) of the spar cap 503.

Figure 7:
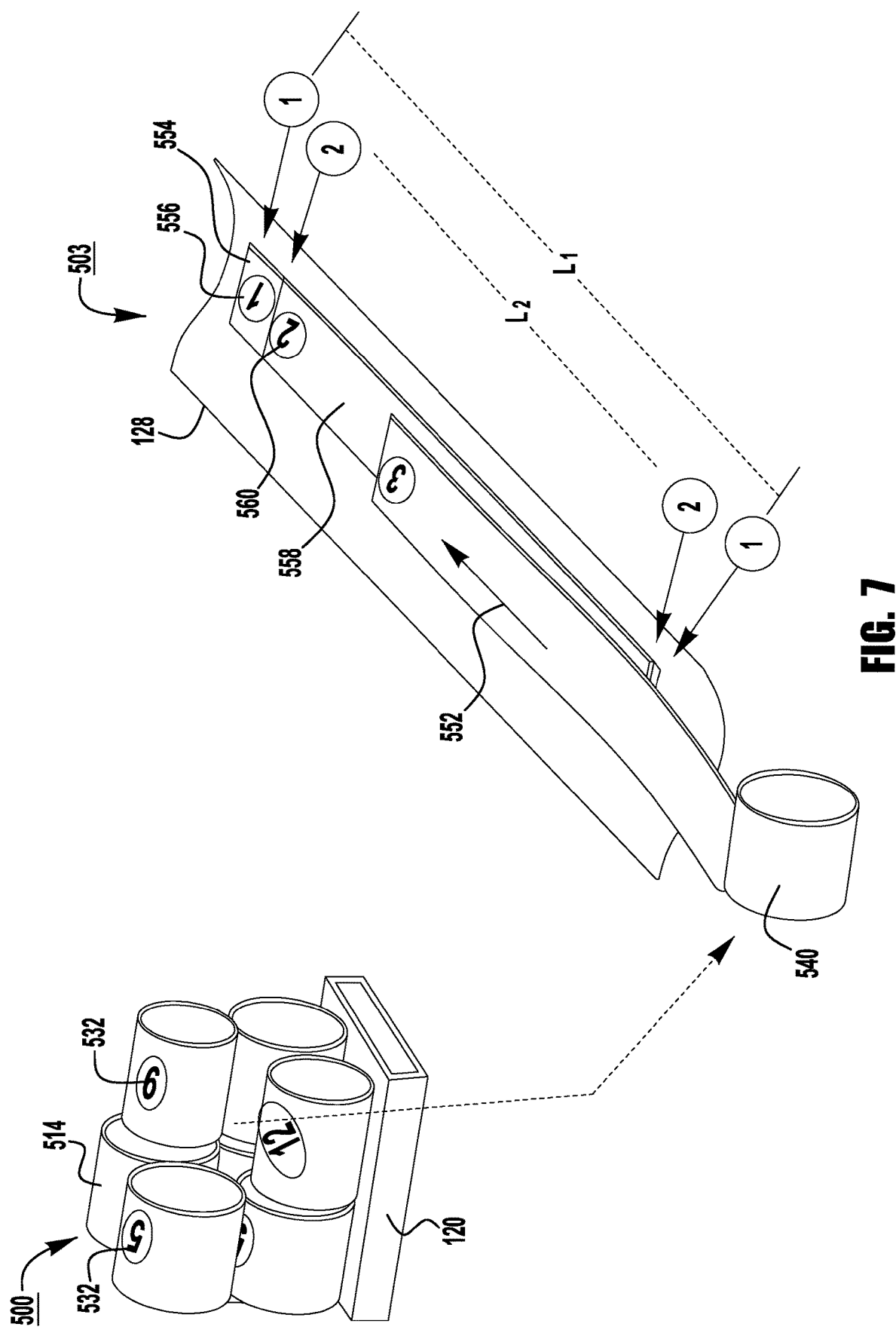
FIG. 7 is a diagram showing use of the rolls of FIG. 6 during production of the spar cap.

As shown in FIG. 7, a first roll 540 of the fabric 504 is taken off the pallet 120 and cut into pieces of desired lengths to be placed in the mold 128.

In particular, a first quantity of the fabric 504 is unrolled in the direction of arrow 552 and then cut to form a first piece 554 of length $L_1$ represented by the dashed line 1-1. The fabric 504 is typically cut manually (e.g., by an operator using shears), since manual cutting is relatively cheap and easy to perform. In conventional systems (e.g., the system 100), this manual cut could be uneven and/or off (e.g., by +/−1 meter) from where it was intended. However, in the system 500, each quantity of the fabric 504 intended to form a cut piece 531 (e.g., the first piece 554) is clearly marked by at least one cut line 530. In this manner, more accurate cutting of the fabric 504 (and thus less waste thereof due to user error) can occur. Furthermore, in conventional systems (e.g., the system 100), it is not easy to tell if a cut piece 531 has been introduced into the mold 128 out of order, i.e., at an incorrect layer position. However, in the system 500, each cut piece 531 (e.g., the first piece 554) is clearly marked with one or more layer numbers 532 printed thereon that designate the correct layer position for the cut piece 531. For example, as shown in FIG. 7, the first piece 554 has a layer number 556 of "1" printed thereon, which indicates that the first piece 554 is intended to form the first layer in the mold 128.

Next, a second quantity of the fabric 504 is unrolled in the direction of arrow 552 and then cut to form a second piece 558 of length $L_2$ represented by the dashed line 2-2. The second piece 558 has a layer number 560 of "2" printed thereon, which indicates that the second piece 558 is intended to form the second layer in the mold 128. As lines 1-1 and 2-2 indicate, the length $L_1$ of the first piece 554 is greater than the length $L_2$ of the second piece 558. While some cut pieces 531 may have the same length, many of the cut pieces 531 will have different lengths. Each successive cut piece 531 is positioned on or otherwise overlapped with the preceding cut pieces 531. Typically, many cut pieces 531 (e.g., 50 or more) are required. This process is repeated until a desired thickness and shape is obtained within the mold 128. Finally, resin is introduced into the mold, such as by the aforementioned infusion process, and cured to form the spar cap 503.

Since many cut pieces 531 of the fabric 504 are required to form the spar cap 503, several rolls 514 must be used to provide the necessary quantity of the fabric 504. Unlike with conventional systems (e.g., the system 100), in the system 500, each of the rolls 514 holds a quantity of the fabric 504 that corresponds to the cut pieces 531 to be obtained from the roll 514. As a result, the cut pieces 531 from a roll 514 (e.g., the roll 540) substantially, if not entirely, exhaust the fabric 504 on the roll 514. Consequently, the system 500 produces significantly less wasted fabric 504. This improvement is further illustrated in the example 800 depicted in FIG. 8.

Figure 8:
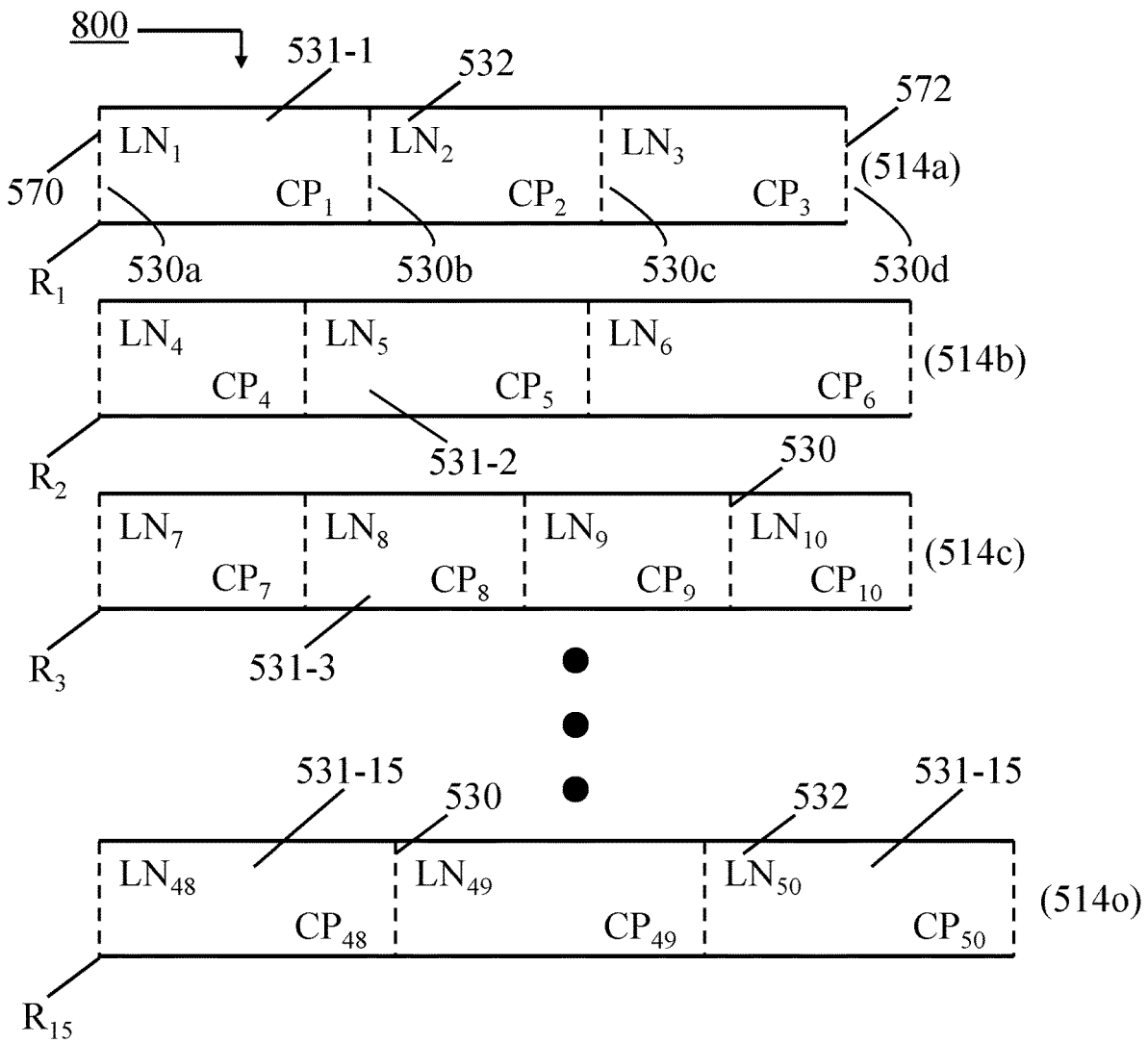
FIG. 8 is a diagram of a collection of rolls, according to an exemplary embodiment, illustrating no wasted fabric.

As shown in FIG. 8, fifteen rolls 514 (i.e., rolls $R_1$, 514a to $R_{15}$, 514o) are needed to obtain fifty cut pieces 531 (i.e., $CP_1$ to $CP_{50}$) of the fabric 504 required to produce the spar cap 503 via the mold 128. From the first roll $R_1$, 514a, three first cut pieces 531-1 (i.e., $CP_1$, $CP_2$, and $CP_3$) of the fabric 504 are obtained, leaving no significant quantity of the fabric 504 on the roll $R_1$. Similarly, from the second roll $R_2$, 514b, three second cut pieces 531-2 (i.e., $CP_4$, $CP_5$, and $CP_6$) of the fabric 504 are obtained, without any excess fabric 504 remaining on the roll $R_2$. From the third roll $R_3$, 514c, four third cut pieces 531-3 (i.e., $CP_7$, $CP_8$, $CP_9$, and $CP_{10}$) of the fabric 504 are obtained, without any excess fabric 504 remaining on the roll $R_3$. This process is repeated until the final roll $R_{15}$, 514o, wherein three fifteenth cut pieces 531-15 (i.e., $CP_{48}$, $CP_{49}$, and $CP_{50}$) of the fabric 504 are obtained, without any excess fabric 504 remaining on the roll $R_{15}$. Thus, little, if any, wasted fabric 504 results from use of the rolls 514 produced by the system 500.

Furthermore, the cut pieces 531 on the rolls 514 are generally marked on each end by a cut line 530 printed on the fabric 504, as described above. For example, as shown in FIG. 8, a first cut piece $CP_1$ is formed between a first cut line 530a and a second cut line 530b. A second cut piece $CP_2$ is formed between the second cut line 530b and a third cut line 530c. A third cut piece $CP_3$ is formed between the third cut line 530c and a fourth cut line 530d. In this manner, the individual cut pieces 531 are readily separated from each roll 514, for example, by manual cutting of the fabric 504 along the cut lines 530. In some embodiments, a starting portion 570 and/or an ending portion 572 of each roll 514 may not be marked with a cut line 530 printed thereon, since no manual cutting of the fabric 504 is necessary at these points.

Each of the cut pieces 531 on the rolls 514 is also marked with at least one layer number 532 printed on the fabric 504, as described above. In some exemplary embodiments, the same layer number 532 is provided on the same cut piece 531 multiple times. For example, in the case of long cut pieces 531, it can be advantageous to place the layer number 532 at least on each opposite end of the cut piece 531. These layer numbers 532 help prevent the incorrect placement of the cut pieces 531 in the mold 128, once the cut pieces 531 are separated from the rolls 514. In some embodiments, the layer numbers 532 allow for the cut pieces 531 to be defined on the rolls 514 in a non-ordered manner, which can help reduce the disparity between the size and/or weight of different rolls 514.

In view of the above, the general inventive concepts allow for a significant reduction (e.g., 4%-7%) in the amount of wasted fabric 504, which can provide benefits such as simplifying the production process (since wasted fabric need not be collected and managed) and reducing costs associated therewith (e.g., the costs of disposing of the wasted fabric).

Figure 9:
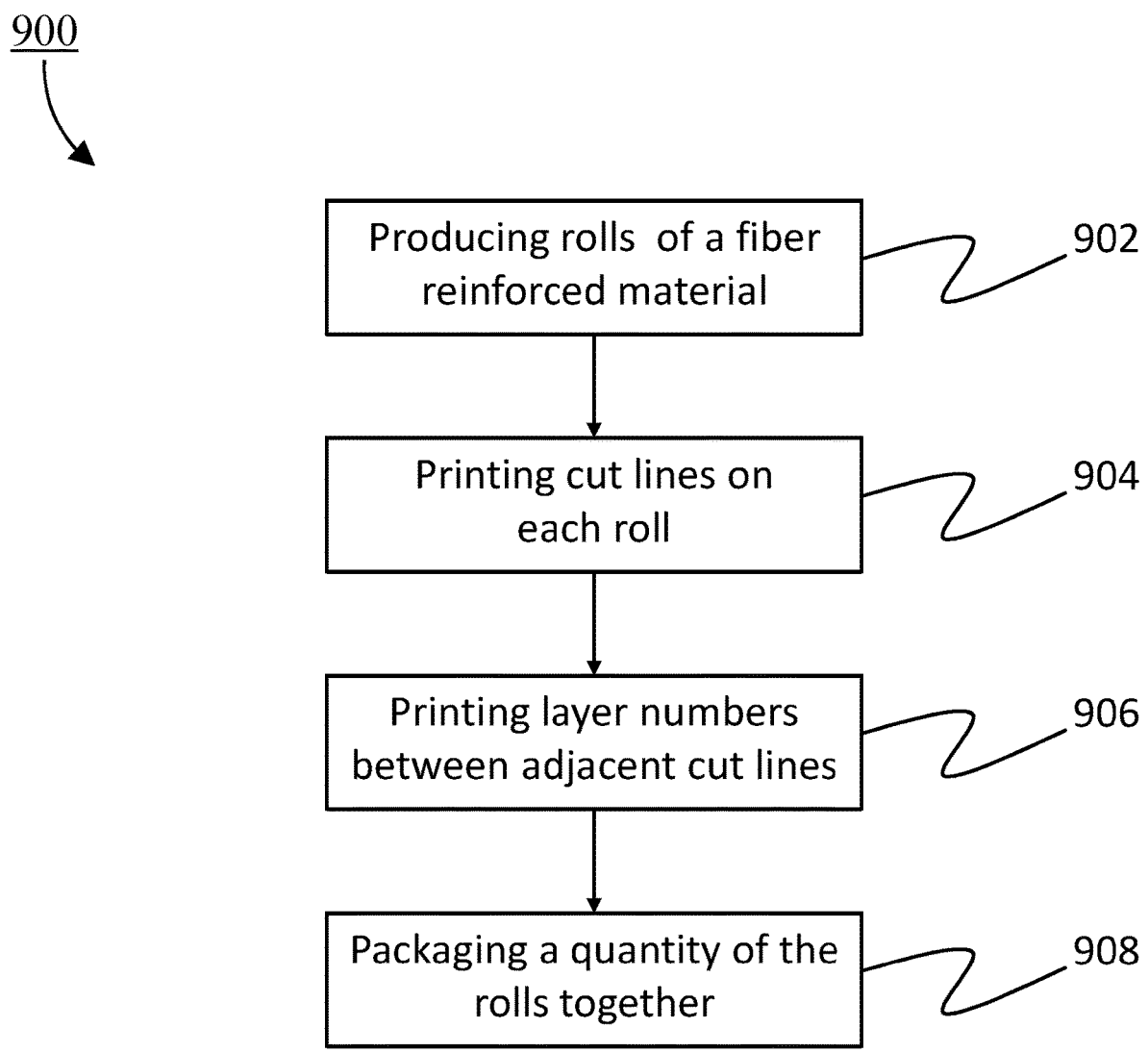
FIG. 9 is a flowchart of a method of forming a structural component, such as a spar cap, according to an exemplary embodiment.

A method 900 of forming a fiber reinforced material for use in producing a structural component 501 (e.g., a spar cap 503), according to an exemplary embodiment, will be described with reference to FIG. 9. The fiber reinforced material may take any suitable form, such as a fabric, mat, veil, etc. Likewise the fiber reinforced material may be reinforced with any suitable type of fibrous material, such as glass fibers, carbon fibers, etc.

In the method 900, a plurality of rolls (e.g., the rolls 514) of the fiber reinforced material (e.g., the fabric 504) are produced. Step 902. The rolls include at least a first roll and a second roll of the fiber reinforced material. A quantity (i.e., length) of the fiber reinforced material on the first roll differs from a quantity (i.e., length) of the fiber reinforced material on the second roll. The fiber reinforced material on each of the first roll and the second roll is intended to be decomposed into a plurality of discrete pieces (e.g., layers of the structural component), such as by cutting the fiber reinforced material. In particular, the quantity (i.e., length) of the fiber reinforced material on each roll corresponds to the quantity of the material required for the pieces to be obtained from the roll. Consequently, each of the rolls can provide the predetermined pieces of the fiber reinforced material with little or no remaining quantity of the fiber reinforced material left on the roll.

To facilitate formation of these pieces, the fiber reinforced material on the first roll has at least one cut line (e.g., the cut line 530) printed thereon to show precisely where the fiber reinforced material should be cut to form the pieces. Step 904. Likewise, the fiber reinforced material on the second roll has at least one cut line printed thereon for the same purpose. Step 904. Typically, each of the rolls will include a plurality of cut lines printed on the fiber reinforced material held thereon. In some embodiments, at least one of the first roll and the second roll includes 3 or more cut lines printed on their fiber reinforced material. In some embodiments, both the first roll and the second roll include 3 or more cut lines printed on their fiber reinforced material. In some embodiments, at least one of the first roll and the second roll includes 4 or more cut lines printed on their fiber reinforced material. In some embodiments, both the first roll and the second roll include 4 or more cut lines printed on their fiber reinforced material. In some embodiments, at least one of the first roll and the second roll includes 5 or more cut lines printed on their fiber reinforced material. In some embodiments, both the first roll and the second roll include 5 or more cut lines printed on their fiber reinforced material. In some embodiments, at least one of the first roll and the second roll includes from 2-12 cut lines printed on their fiber reinforced material. In some embodiments, both the first roll and the second roll include from 2-12 cut lines printed on their fiber reinforced material.

With the discrete pieces delineated on the fiber reinforced material of the rolls, the fiber reinforced material also has at least one layer number (e.g., the layer number 532) printed thereon for each of the pieces to indicate an order in which the pieces are to be positioned relative to one another, such as in the mold 128, to build up the structural component. Step 906. In general, a layer number is printed on the fiber reinforced material somewhere between each adjacent pair of cut lines on the roll. In some embodiments, at least one of the first roll and the second roll includes a plurality of layer numbers printed on their fiber reinforced material. In some embodiments, both the first roll and the second roll include a plurality of layer numbers printed on their fiber reinforced material. In some embodiments, at least one of the first roll and the second roll includes 3 or more layer numbers printed on their fiber reinforced material. In some embodiments, both the first roll and the second roll include 3 or more layer numbers printed on their fiber reinforced material. In some embodiments, at least one of the first roll and the second roll includes 4 or more layer numbers printed on their fiber reinforced material. In some embodiments, both the first roll and the second roll include 4 or more layer numbers printed on their fiber reinforced material. In some embodiments, at least one of the first roll and the second roll includes 5 or more layer numbers printed on their fiber reinforced material. In some embodiments, both the first roll and the second roll include 5 or more layer numbers printed on their fiber reinforced material. In some embodiments, at least one of the first roll and the second roll includes from 3-13 layer numbers printed on their fiber reinforced material.

In some embodiments, both the first roll and the second roll include from 3-13 layer numbers printed on their fiber reinforced material.

Since the number of pieces needed to form the structural component can be relatively large (e.g., 50 or more), many rolls of the fiber reinforced material may be needed. Consequently, according to the method 900, the rolls may be optionally packaged together to facilitate their storage, transport, and use. Step 908. For example, the rolls needed to form the structural component can be packaged on one or more pallets (e.g., the pallet 120). In some embodiments, the rolls are packaged or otherwise arranged in a manner that facilitates their downstream use, e.g., by a customer. In some embodiments, the fiber reinforced material on each roll includes information printed thereon (e.g., the layer numbers) that can be used to tell in which order the rolls are to be used.

The systems and methods described herein provide a more precise and accurate approach to forming structural components from rolls of fiber reinforced material, wherein a substantial reduction in the amount of wasted material can be achieved.

It will be appreciated that the scope of the general inventive concepts is not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof. For example, while the exemplary embodiments shown and described herein often reference production of a spar cap, the general inventive concepts are not so limited and instead are applicable to the production of any structural component formed (at least in part) from discrete layers of a fiber reinforced material obtained from rolls of the material.

The invention claimed is:

1. A system for producing a material for a structural component, said system comprising:
    an apparatus for producing a fabric, said fabric including a plurality of reinforcement fibers;
    at least one printer for printing on the fabric;
    a winder for winding the fabric;
    a cutter for making at least one slit in the fabric to separate the fabric into a plurality of rolls of the fabric, said plurality of rolls including a first roll of the fabric and a second roll of the fabric; and
    a laser cutter;
    wherein the printer prints one or more first lines on the fabric on the first roll, said first lines indicating where the fabric on the first roll is to be separated into a plurality of discrete first pieces for forming the structural component,
    wherein the printer prints one or more second lines on the fabric on the second roll, said second lines indicating where the fabric on the second roll is to be separated into a plurality of discrete second pieces for forming the structural component;
    wherein the laser cutter makes one or more partial cuts in the fabric of the first roll, said partial cuts facilitating separation of the fabric into the discrete first pieces for forming the structural component, and
    wherein the laser cutter makes one or more partial cuts in the fabric of the second roll, said partial cuts facilitating separation of the fabric into the discrete second pieces for forming the structural component.

2. The system of claim 1, wherein a length of the fabric on the first roll differs from a length of the fabric on the second roll.

3. The system of claim 1, wherein a total length of the first pieces of the fabric is at least 95% of the length of the fabric on the first roll, and
    wherein a total length of the second pieces of the fabric is at least 95% of the length of the fabric on the second roll.

4. The system of claim 1, wherein a total length of the first pieces of the fabric is at least 97% of the length of the fabric on the first roll, and
    wherein a total length of the second pieces of the fabric is at least 97% of the length of the fabric on the second roll.

5. The system of claim 1, wherein a total length of the first pieces of the fabric is at least 99% of the length of the fabric on the first roll, and
    wherein a total length of the second pieces of the fabric is at least 99% of the length of the fabric on the second roll.

6. The system of claim 1, wherein the printer prints a layer number on each of the first pieces of the fabric,
    wherein the printer prints a layer number on each of the second pieces of the fabric, and
    wherein the layer numbers indicate an order in which the first pieces of the fabric and the second pieces of the fabric are to be positioned relative to one another when forming the structural component.

7. The system of claim 1, wherein the fabric is a non-crimp fabric.

8. The system of claim 1, wherein the fabric is a woven fabric.

9. The system of claim 1, wherein the reinforcement fibers comprise glass fibers.

10. The system of claim 1, wherein the reinforcement fibers comprise carbon fibers.

* * * * *